United States Patent [19]

Watanabe et al.

[11] Patent Number: 4,498,519
[45] Date of Patent: Feb. 12, 1985

[54] APPARATUS FOR CONTINUOUS MANUFACTURING LEAD OR LEAD ALLOY STRIP

[75] Inventors: Yasushi Watanabe, Nikko; Yuichi Suzuki; Yukihiro Nagata, both of Yokohama; Kiyotaka Hoshino, Nikko, all of Japan

[73] Assignees: The Furukawa Electric Co., Ltd., Tokyo; The Furukawa Battery Co., Ltd., Yokohama, both of Japan

[21] Appl. No.: 491,381

[22] Filed: May 4, 1983

[30] Foreign Application Priority Data

May 11, 1982 [JP] Japan .................. 57-78588

[51] Int. Cl.³ ............................. B21B 13/22
[52] U.S. Cl. .................... 164/417; 164/428; 164/476; 148/400; 29/527.7; 72/205; 72/378
[58] Field of Search .............. 148/3, 400; 29/527.7, 29/33 C, 33 S; 164/417, 476, 428; 72/366, 378, 205, 160, 161

[56] References Cited

U.S. PATENT DOCUMENTS

| 3,171,464 | 3/1965 | Holtz | 72/366 |
| 3,333,452 | 8/1967 | Sendzimir | 164/476 |
| 3,358,358 | 12/1967 | Jenks et al. | 72/205 |
| 3,394,574 | 7/1968 | Franek et al. | 72/378 |
| 4,232,727 | 11/1980 | Bower et al. | 164/417 |
| 4,244,203 | 1/1981 | Pryor et al. | 72/366 |
| 4,291,562 | 9/1981 | Orr | 72/366 |

FOREIGN PATENT DOCUMENTS 2708434 5/1978 Fed. Rep. of Germany ...... 29/33 S

Primary Examiner—L. Dewayne Rutledge
Assistant Examiner—Robert L. McDowell
Attorney, Agent, or Firm—Oblon, Fisher, Spivak, McClelland & Maier

[57] ABSTRACT

A lead or lead alloy strip useful for lattice plates of batteries, which is characterized by having recrystallized structure, and a method and apparatus for continuous manufacturing of said alloy strips directly from molten lead or lead alloy advantageously.

7 Claims, 4 Drawing Figures

APPARATUS FOR CONTINUOUS MANUFACTURING LEAD OR LEAD ALLOY STRIP

DISCLOSURE OF THE INVENTION

The present invention relates to a method for continuous manufacturing of a lead or lead alloy strip by means of continuous casting and rolling and particularly relates to an arrangement for stable manufacturing of a strip having a recrystallized structure.

The lead or lead alloy strips have hitherto been manufactured by the so-called direct rolling method in which a molten metal is poured between a pair of revolving metal rolls being compulsorily cooled, and then subjected to continuous solidification and rolling. In this method, as shown in FIG. 1, the molten lead or lead alloy continuously transferred from a smelting furnace or holding furnace (1) is retained in a tundish (2) and poured into a gap between a pair of compulsorily cooled revolving metal rolls (4) through a pouring nozzle (3) communicated with the tundish (2) so as to cool the molten lead or lead alloy with outer surfaces of the metal rolls (4), and then a solidified layer of the lead or lead alloy is rolled in a required thickness and coiled by a coiler (6) through a slitter (5). (11) indicates a side guide, (12) a feed roll, (13) a roll cylinder and (14) a feed guide. In particular, the lead or lead alloy strip is coiled by the coiler (6) to avoid a forward tension since the lead or lead alloy strip immediately after rolling is soft.

The lead or lead alloy strip of a recrystallized structure is preferable since it is superior in a corrosion resistance. However, the strips manufactured by the direct rolling method are usually in a cast structure or a wrought structure by rolling, or a mixed structure thereof. In other words, since the molten metal is solidified in contact with the compulsorily cooled metal rolls and then rolled as it is, the structure of the strip becomes generally in the cast structure under a low pressure and in the wrought structure by rolling under a high pressure.

Generally speaking, in the solidifying course of the alloy, a phase of alloy having a high melting point first crystallizes out and a phase of alloy having a low melting point crystallizes out in dendritic patterns gradually as the temperature thereof lowers and finally the remaining molten alloy around the dendrite comes to solification.

The cast structure consists of an aggregation of comparatively coarse grains including dendritic crystallized products and is microscopically heterogeneous in alloying element concentration.

The cast structure of ingot is stretched in the longitudinal direction when subjected to working such as rolling and the like, and the dendritic crystallized products are broken and scattered in particles in the direction of rolling thereof.

When the wrought material is subjected to a heat-treatment, a lot of new crystallines grow along grain boundaries or precipitate boundaries. During the period, the particles of precipitate dissolve and diffuse into the matrix. Accordingly, the recrystallized structure consists of uniformly fine equiaxed grains, and is microscopically homogeneous in alloying element concentration.

As stated above, the crystalline structures of metals are roughly classified in the cast structure, the wrought structure and the recrystallized structure, and the difference thereof can be easily distinguished from the study of crystalline structure.

On the other hand, in the mechanical properties thereof, the recrystallized structure has a high tensile strength as the other structures have, and it has a remarkably high ductility, compared with the others as shown in the following table. Therefore, it has excellent characteristics in workability.

TABLE

| alloy | structure | 0.2% proof strength | tensile strength kg/mm$^2$ | elongation % |
|---|---|---|---|---|
| Pb-2.3% Sb | cast structure | 2.8 | 3.6 | 5–6 |
| | wrought structure | 2.7 | 3.6 | 5–6 |
| | recrystallized structure | 2.4 | 3.6 | 18 |
| Pb-0.1% Ca -0.3% Sn | cast structure | same as above | same as above | same as above |
| | wrought structure | same as above | same as above | same as above |
| | recrystallized structure | same as above | same as above | same as above |

DETAILED DESCRIPTION OF THE INVENTION

Figure 1:
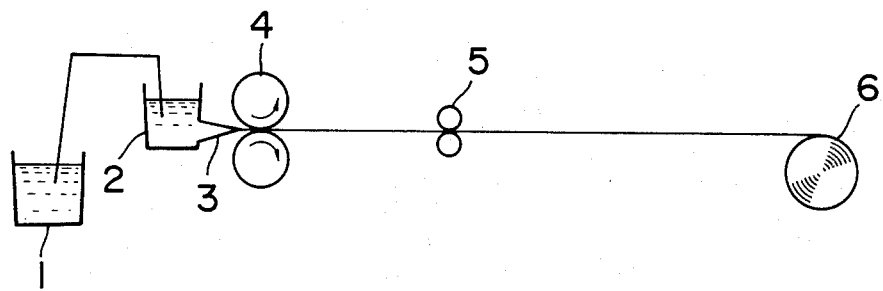
FIG. 1 is an illustration of an example for the conventional casting and rolling method (direct rolling method).

In view of the above circumstances, we have found that a strip of the recrystallized structure is obtained by giving a tension to the strip immediately after rolling and controlling the temperature of the rolled strip under a specific condition, and, with further examinations, have developed a method for continuous and stable manufacturing of the lead or lead alloy strip for producing the strip of the recrystallized structure. Namely, in the continuous casting and rolling method of continuously pouring the molten lead or lead alloy between a pair of revolving metal rolls being compulsorily cooled and cooling the molten lead or lead alloy with outer surfaces of the rolls, and rolling a solidified layer to obtain a strip member, this invention features in giving the front tension to the rolled strip.

In other words, the present invention is arranged to give the front tension to the rolled strip so as to make the tension work on the strip of a sufficiently high temperature immediately after rolling, thus producing the strip of the recrystallized structure. While the reason for the production of the recrystallized structure is not distinct, it is deemed that the action of the tension to the strip of a sufficiently high temperature immediately after rolling causes local strains which act as crystal nucleus and encourage the recrystallization to make the crystallized structure instead of ordinary cast structure or wrought structure by rolling.

The temperature of the strip immediately after rolling depends on casting speed, roll temperature, molten metal temperature and height of the molten metal surface in the tundish while the casting speed is set at a certain high speed from the productivity and the molten metal pouring temperature is set from the quality of the strip. Accordingly, the temperature of the strip immediately after rolling is controlled by the roll temperature and the height of the molten metal surface in the tundish and the tension given to the strip is provided by the coiler (6) by means of gathering the coiling speed or by a tension giving machine such as S-bridle (7) of FIG. 2. In the above cases, the tension is preferably controlled to satisfy the following formula.

$$K = \sqrt{\delta} \times \frac{T_1}{T_0} \quad (1)$$

$$0.45 \geq K \geq 0.17$$

where:

$T_0$: Melting point or solidus line temperature of the strip $T_1$: Temperature of the strip immediately after rolling $\delta$—(Greek letter delta): Forward slip ratio when the front tension is given The forward ratio $\delta$ is a value represented by $$\delta = (V_2 - V_1)/V_1$$

where:

$V_1$: Circumferential speed of the rolls
$V_2$: Running speed of the strip

The reason why the value of K is determined to less than 0.45 and greater than 0.17, is based on the fact that, when K is greater than 0.45, the strain or the temperature of the strip immediately after rolling is too large or high, thereby causing uneven deformations or break and, when K is less than 0.17, the strain is small or the temperature of the strip immediately after rolling is low, thereby failing to effect the recrystallization.

In case of controlling the tension to satisfy the formula (1), a heating device is provided at a forward position to the metal rolls so as to maintain the temperature $T_1$ of the rolled strip at a certain level so that the control of the tension for maintaining the value of K to less than 0.45 and greater than 0.17 is easily carried out, thus to obtain a strip of homogeneous recrystallized structure.

Figure 3:
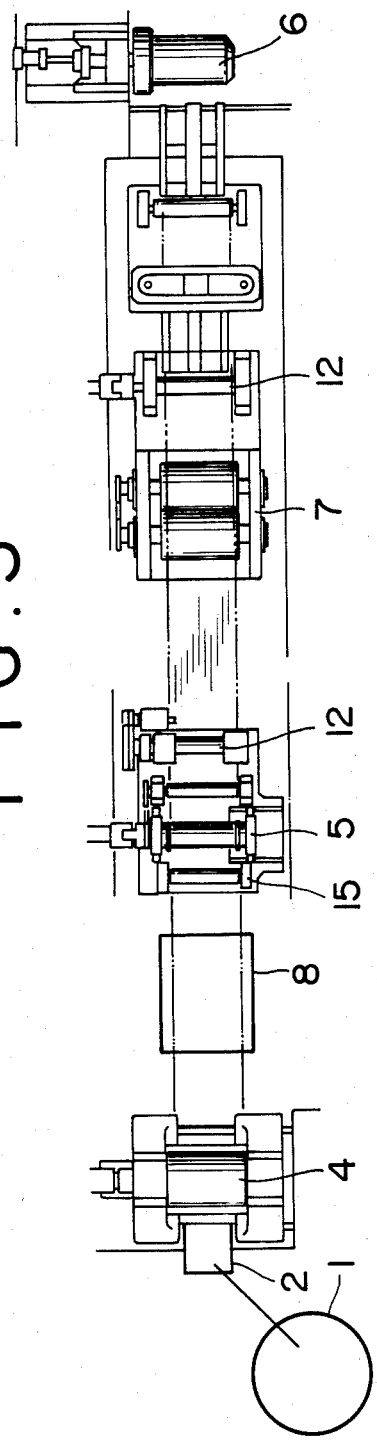
FIGS. 3 and 4 indicate an embodiment of this invention, respectively representing a plan view and a sectional view.
Figure 4:
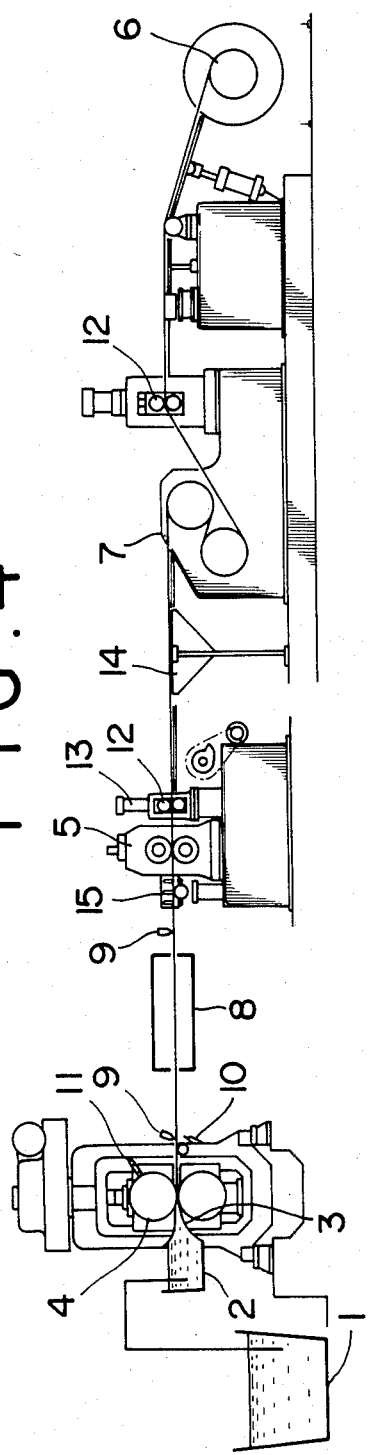

The present invention will be disclosed with reference to an embodiment in FIGS. 3 and 4, respectively representing a plan view and a section view of the invention.

The lead or lead alloy molten in the smelting furnace (1) is transferred to the tundish (2) and poured between a pair of metal rolls (4) through the nozzle (3).

The molten lead and lead alloy is solidified and rolled between the rolls to be produced as a strip member. The strip member is given with a certain tension by the S-bridle (7) and drawn, and then coiled up by the coiler (6).

The strip member is taken with its temperature by the thermometer (9) and measured with its running speed by the speedometer (10). The rolls are measured with their circumferential speed by the roll speedometer (11). These observations are put into the electronic computer through an on-line system, thus to indicate K value after calculation.

Since a set point of K is put into the computer in advance, if K is against the set point, the speed of revolution for the rolls and/or the S-bridle may be controlled to change. Further, the heater (8) may be used for control, as required. These operations are automatically controlled by the computer.

The operational mode for the apparatus of this invention will be described with reference to an embodiment. Pb-2.3%Sb alloy was subjected to a continuous casting and rolling to obtain a strip member in 1 mm thickness and 400 mm breadth by the apparatus of this invention shown in FIGS. 3 and 4.

As for the metal rolls, cast steel rolls with 800 mm of body length and 600 mm of body diameter were used. The value of K was set at $0.35 \geq K \geq 0.30$. The value of K was so controlled as to make the circumferential speed of the rolls 30 m/min. and the running speed of the strip member 37 m/min. by adjusting speed change gears of the rolls and the S-bridle.

At this time, the temperature of the strip member was 160° C. and the tension added thereto was about 1.2 kg/mm$^2$.

Since the roll temperature was increased in course of time after the beginning of casting and as a result the temperature of the strip member was increased almost beyond 175° C., the speed of the S-bridle was decelerated to get the K value within the set point so that the running speed of the strip member was adjusted to 36 m/min.

The strip member thus obtained exhibited a wholly homogeneous and fine recrystallized structure.

In the above embodiment, the example of the S-bridle is indicated for the tension giving machine. However, it is needless to say that three rolls, pinch rolls or the like can be used.

The present invention will be described on the relation between the K value and the structure with reference to the embodiment.

Figure 2:
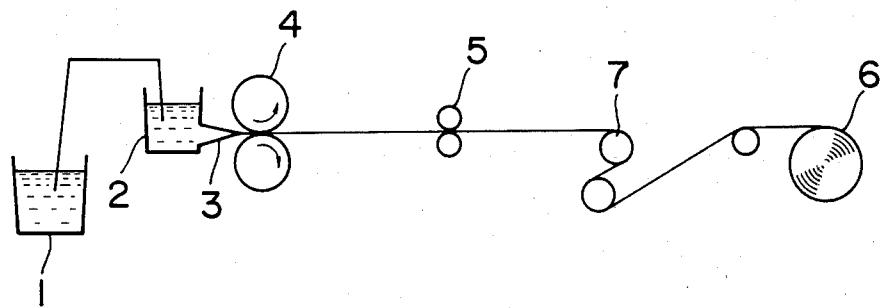
FIG. 2 is an illustration of an example for a continuous casting and rolling method of this invention.

By means of the direct rolling method as shown in FIG. 2, Pb-2.3%Sb alloy and Pb-0.1%Ca-0.3%Sn alloy were subjected to the continuous casting and rolling to produce the lead alloy strips, 1 mm in thickness and 400 mm in breadth. The molten lead alloy transferred was retained in the tundish and poured into between a pair of revolving metal rolls being compulsorily cooled through a pouring nozzle communicated with the tundish to carry out the continuous casting and rolling, and coiled by the coiler through the S-bridle.

As for the metal rolls, cast steel rolls, 800 mm in body length and 450 mm in body diameter, were used. The circumferential speeds of the rolls were fixed and the pouring temperature of the molten metal was set at 360° C., and the running speed of the rolled strip was controlled by the S-bridle to change between 20 m/min. and 28 m/min. The temperature of the strip immediately after rolling was changed between 100° and 220° C. by means of changing the temperature of the roll surface and the height of the molten metal surface in the tundish.

The lead alloy strips thus manufactured were observed as for the structure. Table 1 indicates the structure and the manufacturing condition for Pb-2.3%Sb alloy. Table 2 indicates the structure and the manufacturing condition for Pb-0.1%Ca-0.3%Sn alloy.

TABLE 1

| Manufacturing condition | No. | Roll circumferential speed (m/min.) | Strip running speed (m/min.) | $\sqrt{\delta}$ | Strip solidus line temperature (°C.) | Strip temperature immediately after rolling (°C.) | K | Structure | * corrosion weight loss g/cm² |
|---|---|---|---|---|---|---|---|---|---|
| Conventional condition | 1 | 25 | 25 | 0 | 242 | 100 | 0 | B | 0.186 |
| Conventional condition | 2 | " | " | 0 | " | 140 | 0 | B | 0.188 |
| Conventional condition | 3 | " | " | 0 | " | 160 | 0 | B | 0.197 |
| Conventional condition | 4 | " | " | 0 | " | 200 | 0 | B | 0.188 |
| Comparative condition | 5 | " | 27 | 0.283 | " | 100 | 0.117 | B | 0.169 |
| Comparative condition | 6 | " | " | " | " | 140 | 0.164 | B | 0.159 |
| Comparative condition | 7 | " | " | " | " | 160 | 0.187 | A | 0.135 |
| Condition of this invention | 8 | " | " | " | " | 200 | 0.234 | A | 0.128 |
| Comparative condition | 9 | " | 29 | 0.40 | " | 100 | 0.165 | B | 0.166 |
| Condition of this invention | 10 | " | " | " | " | 140 | 0.231 | A | 0.129 |
| Condition of this invention | 11 | " | " | " | " | 160 | 0.264 | A | 0.118 |
| Condition of this invention | 12 | " | " | " | " | 200 | 0.331 | A | 0.139 |
| Condition of this invention | 13 | " | 31 | 0.49 | " | 100 | 0.202 | A | 0.113 |
| Condition of this invention | 14 | " | " | " | " | 140 | 0.283 | A | 0.141 |
| Condition of this invention | 15 | " | " | " | " | 160 | 0.324 | A | 0.119 |
| Condition of this invention | 16 | " | " | " | " | 200 | 0.405 | A | 0.123 |
| Condition of this invention | 17 | " | 33 | 0.566 | " | 100 | 0.234 | A | 0.125 |
| Condition of this invention | 18 | " | " | " | " | 140 | 0.327 | A | 0.128 |
| Condition of this invention | 19 | " | " | " | " | 160 | 0.374 | A | 0.131 |
| Comparative condition | 20 | " | " | " | " | 200 | 0.468 | A (Break) | — |
| Condition of this invention | 21 | " | 35 | 0.632 | " | 100 | 0.261 | A | 0.129 |
| Condition of this invention | 22 | " | " | " | " | 140 | 0.366 | A | 0.132 |
| Condition of this invention | 23 | " | " | " | " | 160 | 0.418 | A | 0.141 |
| Comparative condition | 24 | " | " | " | " | 200 | 0.522 | A (Break) | — |

Note:
A Recrystallized structure
B Cast structure or/and wrought structure by rolling A test piece of 40(L) × 50(W) × 1.0(Thickness)mm was employed as an anode and was subjected to a corrosion test. The corrosion weight loss was obtained from weight difference between before and after the test.
*current density 20 mA/cm²
temperature 40° C.
Specific weight of aq. sulfuric acid 1.26/20° C.
test period 400 hrs.

TABLE 2

| Manufacturing condition | No. | Roll circumferential speed (m/min.) | Strip running speed (m/min.) | $\sqrt{\delta}$ | Strip solidus line temperature (°C.) | Strip temperature immediately after rolling (°C.) | K | Structure | * corrosion weight loss g/cm² |
|---|---|---|---|---|---|---|---|---|---|
| Conventional condition | 1 | 20 | 20 | 0 | 316 | 100 | 0 | B | 0.171 |
| Conventional condition | 2 | " | " | 0 | " | 140 | 0 | B | 0.157 |
| Conventional condition | 3 | " | " | 0 | " | 180 | 0 | B | 0.155 |
| Conventional condition | 4 | " | " | 0 | " | 220 | 0 | B | 0.137 |
| Conventional condition | 5 | " | " | 0 | " | 260 | 0 | B | 0.141 |
| Comparative condition | 6 | " | 22 | 0.32 | " | 100 | 0.10 | B | 0.123 |
| Comparative condition | 7 | " | " | " | " | 140 | 0.14 | B | 0.128 |

TABLE 2-continued

| Manufacturing condition | No. | Roll circumferential speed (m/min.) | Strip running speed (m/min.) | $\sqrt{\delta}$ | Strip solidus line temperature (°C.) | Strip temperature immediately after rolling (°C.) | K | Structure | *corrosion weight loss g/cm² |
|---|---|---|---|---|---|---|---|---|---|
| Comparative condition | 8 | " | " | " | " | 180 | 0.18 | A | 0.113 |
| Comparative condition | 9 | " | " | " | " | 220 | 0.223 | A | 0.108 |
| Condition of this invention | 10 | " | " | " | " | 260 | 0.283 | A | 0.104 |
| Comparative condition | 11 | " | 24 | 0.447 | " | 100 | 0.141 | B | 0.134 |
| Comparative condition | 12 | " | " | " | " | 140 | 0.198 | A | 0.107 |
| Condition of this invention | 13 | " | " | " | " | 180 | 0.255 | A | 0.100 |
| Condition of this invention | 14 | " | " | " | " | 220 | 0.311 | A | 0.098 |
| Condition of this invention | 15 | " | " | " | " | 260 | 0.368 | A | 0.102 |
| Comparative condition | 16 | " | 26 | 0.548 | " | 100 | 0.173 | A | 0.115 |
| Condition of this invention | 17 | " | " | " | " | 140 | 0.243 | A | 0.109 |
| Condition of this invention | 18 | " | " | " | " | 180 | 0.312 | A | 0.107 |
| Condition of this invention | 19 | " | " | " | " | 220 | 0.381 | A | 0.094 |
| Comparative condition | 20 | " | " | " | " | 260 | 0.451 | A (Break) | — |
| Comparative condition | 21 | " | 28 | 0.632 | " | 100 | 0.200 | A | 0.105 |
| Condition of this invention | 22 | " | " | " | " | 140 | 0.280 | A | 0.101 |
| Condition of this invention | 23 | " | " | " | " | 180 | 0.360 | A | 0.115 |
| Condition of this invention | 24 | " | " | " | " | 220 | 0.440 | A | 0.111 |
| Comparative condition | 25 | " | " | " | " | 260 | 0.520 | A (Break) | — |

Note:
A Recrystallized structure
B Cast structure or/and wrought structure by rolling As apparent from Tables 1 and 2, the lead alloy strips subjected to the continuous casting and rolling of this invention to satisfy the above formula (1) all made the recrystallized structure while the lead alloy strips subjected to the conventional continuous casting and rolling all made the casting structure or/and the rolling structure.

Furthermore, when K value of the formula (1) was greater than 0.45, the lead alloy strips immediately after rolling caused a trouble such as break and the lead alloy strips, in case of less than 0.17 of K value, all made the cast structure or/and the wrought structure by rolling.

These lead alloy strips were fabricated into punched grids or expanded grids which were coated with active material and assembled into batteries. The use of those grids to the batteries indicated that the grids of this invention satisfying the above formula (1) were remarkably improved in the corrosion resistance in comparison with the conventional ones and enhanced the life of the batteries greatly.

While the above description to the lead alloy strips, pure lead strips or their lead alloy strips of Pb-0.07%Ca can also obtain almost the same results.

The lead alloy strips of No. 14 in Table 1 and No. 17 in Table 2 were punched to lattice plates and applied with active materials, and they were constructed to batteries (JIS D5301, Ns 4 OZ, 12 V) for automobile, respectively. The life of these batteries were investigated by the overcharging life test in comparison with the conventional batteries.

The results are shown in Table 3, and the batteries using the lead alloy strips of this invention for the lattice plates are apparently more excellent in the life time tests than the conventional ones.

TABLE 3

| Result of overcharging life test | | |
|---|---|---|
| Alloy of Lattice Plate | Battery | number of cycle |
| Pb-2.3% Sb | Battery using lead alloy strip of this invention | 13, 12, 15 |
| | Conventional battery | 7, 9, 10 |
| Pb-0.1% Ca -0.3% Sn | Battery using lead alloy strip of this invention | 7, 9, 8 |
| | Conventional battery | 4, 5, 5 |

Testing Method (1) Charging of 4.5 A was continuously carried out for 110 hrs.
(2) After charging, test samples were allowed to stand for 48 hrs under open-circuit conditions.
(3) After being allowed to stand, discharging of 150 A was continuously carried out for 30 seconds, (1)-(3) were set to 1 cycle, and it was set to the end of life when terminal voltage thereof reached 7.2 V within 30 seconds, and at that time, the overcharging tests were stopped.

The above tests were carried out at 40°–45° C. of atmospheric temperature, employing three batteries per set respectively.

As described in the foregoing, the present invention features in manufacturing the lead or lead alloy strips of the recrystallized structure superior in the corrosion resistance easily and stably by the continuous casting and rolling, and brings about an industrial effect considerably.

What is claimed is:

1. An apparatus for continuously manufacturing lead or lead alloy strip, comprising:
   (a) means for continuously applying molten lead or lead alloy having a melting point $T_0$ to a pair of cooling rolls;
   (b) a pair of cooling rolls which simultaneously solidifies said molten lead or lead alloy and shapes the metal into a continuously moving strip having a temperature $T_1$ which is the temperature of the strip immediately after rolling, said cooling rolls necessarily being cooled in order to continuously cool the molten metal applied to the surface of the pair of rolls;
   (c) means for applying forward tension to said continuously moving strip such that said strip has a forward slip ratio $\delta$, the forward tension being such that the following relationship is maintained:

$$K = \sqrt{\delta} \times T_1/T_0$$

wherein $0.45 \geq K \geq 0.17$
   (d) take-up means for coiling said continuously moving strip.

2. The apparatus of claim 1, wherein a slitter is provided before said take-up means.

3. The apparatus of claim 1, wherein a tension providing machine is provided before said take-up means.

4. The apparatus of claim 1, wherein a slitter and a tension providing machine are provided before said take-up means.

5. The apparatus of claim 1, wherein said apparatus is provided with a heater in order to maintain the temperature of said moving strip at a certain temperature.

6. The apparatus of claim 1, wherein said apparatus further comprises a circumferential speedometer to measure the circumferential speed of said cooling rolls, a running speedometer to measure the speed of said continuously moving strip and a thermometer to measure the temperature of said continuously moving strip, said measuring devices being provided so that the K-value of the system can be determined.

7. The apparatus of claim 1, wherein the K-value of said apparatus is set at a certain value by means of controlling the circumferential speed of said cooling rolls and the running speed of said continuously moving strip, and by cooling said molten lead or lead alloy having a melting point $T_0$ to temperature $T_1$ immediately after rolling.

* * * * *